United States Patent
Brand et al.

(10) Patent No.: US 7,136,478 B1
(45) Date of Patent: Nov. 14, 2006

(54) INTERACTIVE VOICE RESPONSE UNIT RESPONSE DISPLAY

(75) Inventors: Thomas E. Brand, Marsfield (AU); Chris Goringe, Seven Hills (AU)

(73) Assignee: Avaya Technology Corp., Basking Ridge, NJ (US)

(*) Notice: Subject to any disclaimer, the term of this patent is extended or adjusted under 35 U.S.C. 154(b) by 170 days.

(21) Appl. No.: 10/819,492

(22) Filed: Apr. 6, 2004

Related U.S. Application Data

(60) Provisional application No. 60/536,453, filed on Jan. 13, 2004.

(51) Int. Cl.
*H04M 3/00* (2006.01)

(52) U.S. Cl. .............................. 379/265.09; 455/456.2

(58) Field of Classification Search ...................... None
See application file for complete search history.

(56) References Cited

U.S. PATENT DOCUMENTS

2003/0186722 A1* 10/2003 Weiner ........................ 455/558
2004/0180673 A1* 9/2004 Adams et al. ........... 455/456.2

* cited by examiner

*Primary Examiner*—Creighton Smith
(74) *Attorney, Agent, or Firm*—Sheridan Ross P.C.

(57) ABSTRACT

The present invention is directed to a telecommunication device 174 or 180 including (a) an input operable to receive from an endpoint, as part of a live voice communication, a text message and an audio message, the audio message being a voiced version of the text message; (b) a character display; (c) at least one activator; and (d) a graphical display agent 184 operable to (i) display the text message on an associated character display 300 and (ii) audibly play the audio message.

40 Claims, 4 Drawing Sheets

INTERACTIVE VOICE RESPONSE UNIT RESPONSE DISPLAY

CROSS REFERENCE TO RELATED APPLICATION

This application claims the benefits under 35 U.S.C. § 119 of U.S. Provisional Patent Application Ser. No. 60/536,453, filed Jan. 13, 2004, of the same title to the same inventors, which is incorporated herein by this reference.

FIELD OF THE INVENTION

The present invention is directed generally to servicing a contactor in a contact center and specifically to providing information to the contactor as part of a call from the contactor.

BACKGROUND OF THE INVENTION

Contact centers are employed by many enterprises to service customer contacts. A typical contact center includes a switch and/or server to receive and route incoming contacts and one or more resources, such as human agents and Interactive Voice Response (IVR) units, to service the incoming contacts. It is common for a contact center to initially assign an incoming contact to an IVR to collect personal information from the contactor and thereafter assign the contact to be serviced to an agent having the appropriate skills based on the collected personal information.

An IVR typically uses a menu structure to obtain the desired information from a contactor. A typical menu structure is configured in a tree-type structure with numerous branches possible depending on the option selected. For example, a level of an IVR option menu may say to the contactor "Press 1 for customer service", "Press 2 for sales", and "Press 3 for product service". If the contactor, presses "2", the contactor may be provided with a next option level that may say "Press 1 for toy sales", "Press 2 for board game sales", and "Press 3 for computer game sales." An option may be selected by pressing a key on the keypad of the phone, which generates a DTMF signal, and/or voicing the number of the option, which is captured at the contact center by a speech recognition engine.

Navigating through a long, complicated IVR menu structure can be a frustrating experience for contactors, causing a high incidence of dropped calls and higher levels of customer dissatisfaction. For example, when calling into an IVR, the contactor often has to wait and listen to most of the options provided before choosing which option is the most appropriate one for the purpose of the contact. At times, there are so many choices on a given option level that the contactor may have forgotten the earlier choices before he or she is able to make a decision. This may happen for example when a contactor is uncertain about which option is correct for his or her needs. Forgetting the earlier options requires the contactor to listen to all of the options at the option level a second time. Moreover, when listening to the various options in the presence of background noise, the contactor may be unable to hear some of the voice prompts clearly enough to understand the option.

It is desirable for a contactee to be provided with the various options at each level of the menu not only audibly but also visually to avoid customer confusion and reduce customer frustration.

SUMMARY OF THE INVENTION

These and other needs are addressed by the various embodiments and configurations of the present invention. The present invention is directed generally to a telecommunication device that displays text messages from an endpoint.

In one embodiment, the present invention is directed to a telecommunication device, that includes:

(a) an input to receive from an endpoint, as part of a live voice communication, a text message and an audio message, the audio message being a (human and/or automated) voiced version of the text message;

(b) a character display;

(c) one or more activators (e.g., keys, buttons, or other actuators, etc.); and (d) a graphical display agent to display the text message on an associated character display and audibly play (e.g., over a speaker) the audio message.

The telecommunication device is particularly useful for displaying text messages as part of a real-time contact. As used herein, a real-time contact refers to a contact in which the contacting entity or customer is present during the waiting (or queuing) period and can choose to abandon or disconnect the contact if the call is not serviced within an acceptable period. Common examples include voice calls, VoIP, text-chat, video calls, and the like. A non-real-time contact refers to a contact in which the contacting entity or customer is unable to abandon or disconnect the contact. Common examples include e-mail, fax, electronic or paper documents, webform submissions, voice messages, and the like.

The graphical display agent can store the displayed text in memory and scroll through the displayed text at the request of a user of the telecommunication device.

The endpoint is typically a servicing resource of a contact center, such as an Interactive Voice Response (IVR) unit or a voice mail server. As used herein, an IVR refers to a computational component that provides voice prompts to a user and/or converts user input in response to the voice prompts into one or more computer commands or data (e.g., effect menu and/or option selections, provide information such as names or words, etc.). For example, an IVR can capture and "understand" touchtone (DTMF) keypad input or voice responses from a user.

The text message can be transmitted to the telecommunication device either in-band (on the same channel and/or medium as the voice communications) or out-of-band (on a different channel and/or medium than that used by the voice communications). The text message is typically transmitted using the Teletypewriter (TTY) protocol or the Short Messaging Signal or SMS protocol. The text message can be sent as a series of DTMF signals.

The telecommunication device is typically circuit-switched but can be packet-switched, depending on the application.

The graphical display agent can be configured to receive a response from a user of the telecommunication device; display the response on the character display; store the response in memory; and scroll back-and-forth through the displayed text at the request of the user of the telecommunication device. The display agent can send the response to the servicing resource automatically or only after a transmit request is received from the user.

To facilitate review of the response by the user, the display agent can, at the command of the user, clear the character display of currently displayed information before the user response is displayed. Alternatively, the display device can insert at least one marker character in the displayed response to separate the characters in the response from other displayed characters.

Rather than display the response to the user before the response is sent to the servicing resource, the display agent can alternatively send the response to the servicing resource and receive, from the servicing resource, a second text message comprising the response. The received second text message can then be displayed on the character display.

Compared to conventional contact centers, the present invention can provide decreased customer frustration from navigating through IVR menus, fewer customer hang ups, increased levels of customer satisfaction, and decreased contact center service times due to more efficient collection of personal information from contactors before servicing of the contact by a live (human) agent commences. Customers do not have to replay forgotten portions of the IVR menu but can simply scroll through the displayed IVR menu before selecting an option. This permits more rapid and efficient information collection and can significantly decrease queue wait times. Additionally, the graphical display and audible playing of the same text can assist the customer in remembering the various options at each menu level. Customers that are hearing impaired or disabled can benefit greatly from the graphical display of the options. The present invention can be used on any telecommunication device having a character display, whether circuit- or packet-switched or wired or wireless. By mixing voice and data through a published protocol, such as basic TTY (or alternatively transmitting voice and TTY messages), even circuit-switched telephones can readily display the available menu options. Even non-option information, such as account balance, card number entered, or receipt number can be displayed back to the user using the telecommunication device of the present invention.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
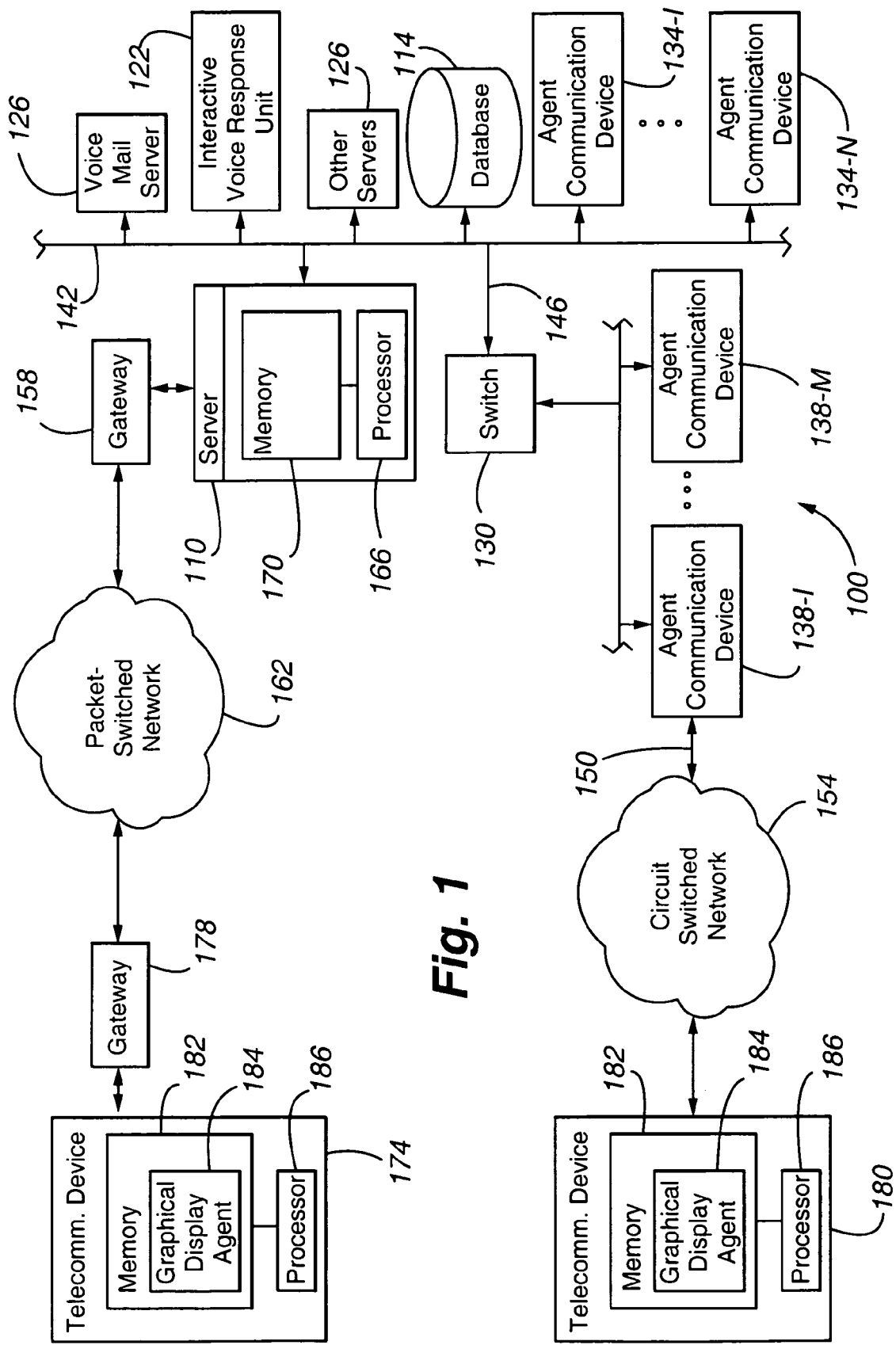
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Telecommunication Network or PSTN 154 and to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The server 110 in this implementation includes a processor 166 and a memory 170. The processor 166 may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, and/or S8300™ media server. Other types of known switches and servers are well known in the art and therefore not described in detail herein. The switch and server are typically stored-program-controlled systems. The switch and/or server comprises a network interface card (not shown) to provide services to the serviced telecommunication devices. Included in the memory 170 is a contact controller (not shown) for handling incoming and outgoing contacts The gateway 158 can be Avaya Inc.'s, G700 Media Gateway™ and may be implemented as hardware such as via an adjunct processor (as shown) or as a chip in the server or in some other hardware and/or software combination.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the central server 110 forwards instructions to the component to forward or route the contact to a specific contact center resource, such as the IVR unit 122, the voice mail server 126, and/or first or second telecommunication device 134, 138 associated with a selected agent. The routing decision can be based on any suitable parameters, such as customer identity, customer needs, contact center needs, current contact center queue lengths, and the like. The server 110 distributes and connects these contacts to telecommunication devices of available agents based on a set of predetermined criteria. When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

Figure 2:
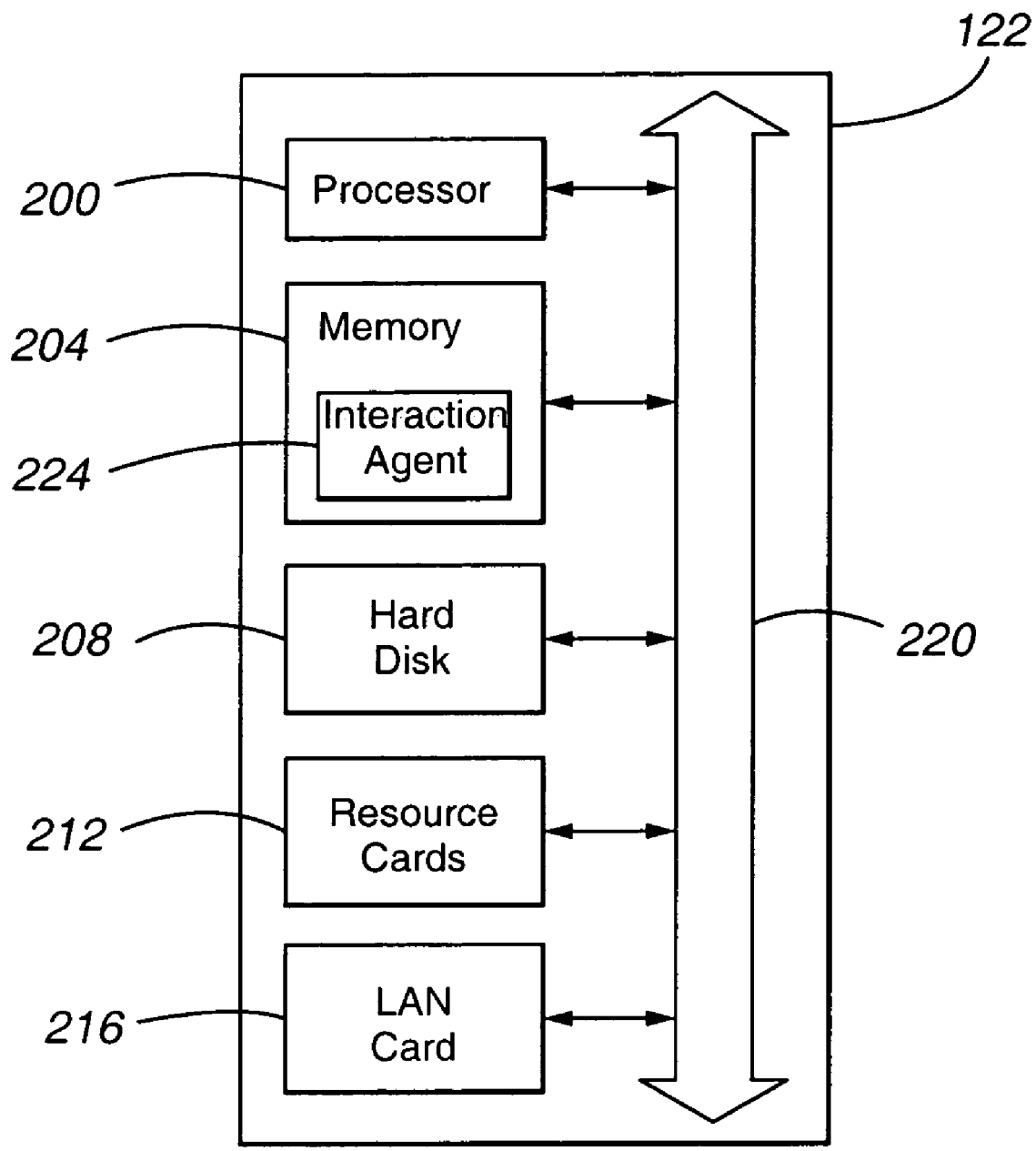
FIG. 2 is a block diagram of an IVR according to an embodiment of the present invention.
Figure 3:
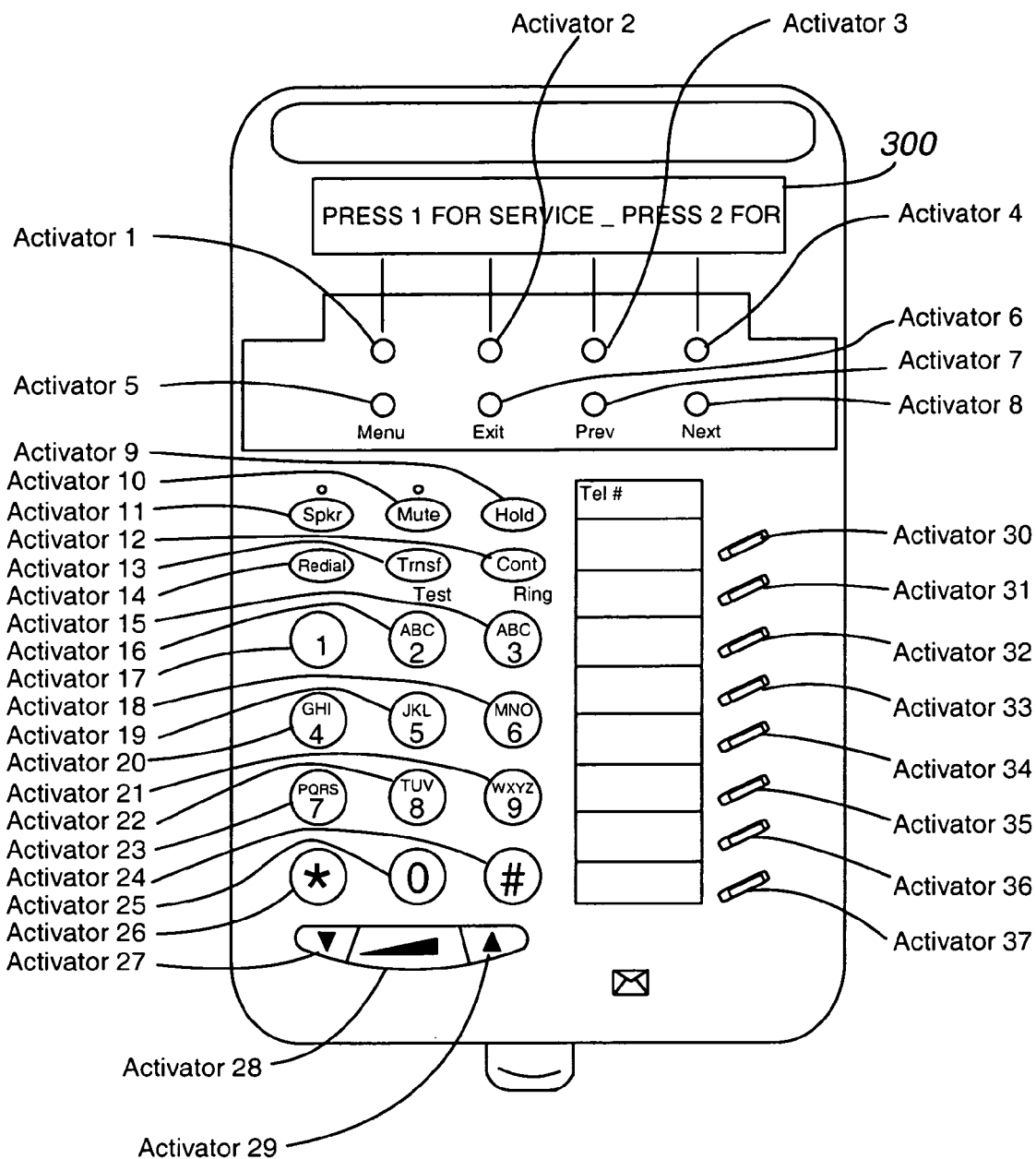
FIG. 3 is a plan view of a teletelecommunication device according to an embodiment of the present invention.

The configuration of the external telecommunication devices 174 and 184 is shown in FIGS. 1 and 2. Each device 174 and 184 includes a memory 182 and processor 186. As shown in FIG. 2, the telecommunications device 174 or 180 includes activators 1–37 and character display 300.

The memory 182 includes a graphical display agent 184 that is operable to receive signals from the contact center resource servicing the contact and graphically display the text of the signals on the character display of the telecommunication device. The text can be graphically displayed before, during, or after audible presentation of the text to the contactor over the speaker of the telecommunications device 174 or 180. For example, when an option, such as "press 1 for sales", is played over the speaker the option is simultaneously displayed over the character display 300 of the telecommunication device 174 or 180. For selecting among a large number of possible options at any menu level, the agent 184 could store the various options in memory 182 and let the contactor scroll back and forth through the various options using suitable activators, such as activators 27, 28, and/or 29. Alternatively or additionally, the options can be displayed on the activators, keys or buttons of the telecommunication device, as in the case of a Softphone.

The graphical display agent 184 is further operable to receive the selection from the contactor and forward the selection, using a suitable protocol, to the servicing resource at the contact center. As the selection is inputted, it is displayed on the character display. The selection can be stored in memory 182 to permit the contactor to scroll back and forth through the inputted selection and, when acceptable, forward the selection to the contact center resource upon receipt of a signal that the contactor has pressed one or more designated activators, such as activator 13 or 24. For example, when the user is inputting a credit card number or account number the user can review the number and verify its accuracy before the number is transmitted to the servicing resource. To permit more ready readability, the agent 184 can permit the user to clear the character display of currently displayed text, such as by pressing activator 6, before the card number or account number is inputted. This prevents the inputted text from running into the currently displayed text and creating an unreadable or unrecognizable text string. Alternatively, the user can press an activator to cause a space or other marker to be displayed so that the inputted response can be readily distinguished from other displayed information, such as the number called or the displayed text message received from the servicing resource.

The contact center 110 or servicing resource 126, 122, 126, 134-1 to -N, or 138-1 to -M can include an interaction agent to transmit text messages in proper format for display on the character display 300 using the proper protocol. An example of a resource containing such an agent is an IVR 122 depicted in FIG. 2. The IVR 122 includes a processor 200, memory 204, hard disk drive 208, resource cards 212, and LAN card 216, such as an Ethernet card, and bus 220 connecting the components. IVR hard disk drive 208 stores prerecorded prompts, platform software for operation, administration and maintenance of the IVR 122 such as backup, speech administration, interface software to communicate with other servers, such as the voice mail server 126, web server, host database 114, and the server 110. The operation of the IVR 122 also includes the interaction agent 224 discussed below.

The IVR 122 includes the resource cards 212 to handle digit collection from dual tone multi-frequency (DTMF) telephones and automatic speech recognition (ASR) resources to understand customer responses when the customer chooses to speak their responses, voice processing resources to record customer's prompts, and basic telephony control such as transfer, hanging-up, and answering the telephone call. Additionally, the IVR includes text-to-speech (TTS) resources to convert text in a file or on a web page into digital audio. Of course, additional voice processing, DTMF, TTS, and ASR resources may reside on another server.

The interaction agent 224 receives the prerecorded prompts in text or audio form, formats the prompts into a text message according to the proper transmission protocol, and forwards the text message to the device 174 or 180 via server 110. When the prompt is in audio form, an ASR resource, at the request of the agent 224, can convert the prompt into text form. In one configuration, the interaction agent 224 can receive user-inputted information from the telecommunication device 174 or 180 and transmit the received information back to the device 174 or 180 for display on the graphical display 300 by the graphical display agent 184. For example, if the user/contactor inputs a long credit card number or account number the inputted number can be transmitted back to the agent 184 for display to the user to confirm that the number was properly inputted. The user can then press a suitable activator, such as activator 24, to indicate that the number was correctly inputted and received. The servicing resource can then proceed using the inputted information.

The agents 224 and 184 are each preferably a software module in the telecommunication device but may be a hardware component, such as a logic circuit.

The prerecorded prompts are typically provided by the interaction agent 224 to the graphical display agent 184 after completion of call set up and routing to the servicing resource.

The text message to the telecommunication device 178 or 180 may be transmitted by any suitable protocol for the network carrying the transmission either in-band or out-of-band with the communication medium carrying the contact initiated by the user. For example, the personal information may be transmitted in-band and/or out-of-band using the TTY (TeleTypeWriter) protocol, DTMF signals, an SMS message, TCP/IP suite of protocols, H.323, the Session Initiation Protocol or SIP, and the Lightweight Directory Access Protocol or LDAP.

Figure 4:
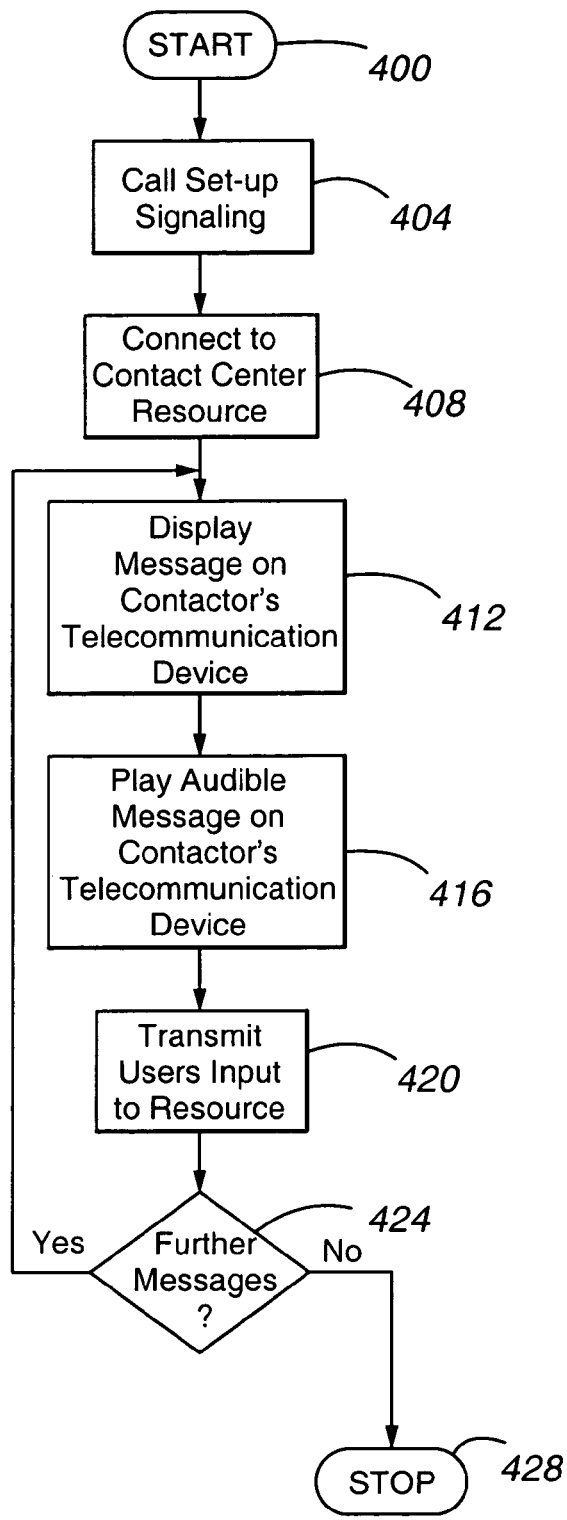
FIG. 4 is a flow chart depicting the operation of the graphical display agent according to an embodiment of the present invention.

The operation of the agents 224 and 184 will now be described with reference to FIG. 4.

In step 400, the user initiates a live or real-time contact with the contact center 100. This is typically effected by dialing a telephone number or typing an electronic address, such as an IP address or by selecting a hyperlink.

In step 404, communication (e.g., call) set up signals are exchanged between the contacting telecommunication device 174 or 180 and the contact center 100 or a resource thereof.

In step 408, after the communication set up is completed, the contact center 100 selects a resource to service the communication and routes the communication to the selected resource. As part of the routing process or after routing is effected, the contacting telecommunication device 174 or 180 and contact center 100 exchange handshake signals to ensure that each of the telecommunication devices 174 or 180 has the necessary capabilities to receive text messages and display the text messages on the graphical display 300 of the telecommunication device. For the TTY protocol, the handshake signals can be a special set of characters. One set of characters sent in one direction between the device 174 or 180 and contact center 100 would effectively ask "Do you understand?" and the second different set of characters sent in the other direction would effectively respond "Yes."

If the handshake is completed successfully (meaning that the correct response is received), the servicing resource, at some point during the communication, forwards to the telecommunication device 174 or 180 a text message, which may be sent in addition to or in lieu of an audio message, to be displayed on the graphical display 300. The text of the message may be forwarded to the server 110 by the interaction agent 224.

In step 412, the graphical display agent 184 receives the text message and causes the text of the message to be displayed on the graphical display 300 of the telecommunication device.

In step 416, the audio version of the text message can be played to the user before, during or after display of the text message. Step 416 is typically optional. It may be performed when the message is from an IVR or voice mail server. It may not be performed when the text message is from a human agent.

In step 420, the graphical display agent 184 receives a response from the user. The response may be a voiced response or an unvoiced response, such as the pressing of one or more activators on the telecommunication device (e.g., which generate DTMF signals). The inputted response can be displayed on the graphical display for review by the user. In one configuration, the response is not sent to the servicing resource/contact center until the user presses an activator or key on the telecommunication device 174 or 180. This configuration permits the user to review the inputted response for accuracy. If the response is inaccurate, the user by voicing or otherwise inputting (e.g., pressing a selected activator or key) a selected command can cause the graphical display agent 184 to clear the display and discard the previously inputted response. The user can then re-input the response for graphical review. When the response is correct, the user can command the device 174 or 180 to forward the response to the servicing resource/contact center. Alternatively, the inputted response can be received by the interaction agent 224 and resent to the telecommunication device 174 or 180 for display on the character display 300 by the graphical display agent 184. The user could then transmit a response to the contact center 100 indicating whether or not the previously inputted and displayed response is correct. If not, the interaction agent 224 could cause a further text message requesting re-input of the response to be displayed on the character display 300.

In step 424, the graphical display agent 184 awaits further text messages from the servicing resource. If received, the agent 184 returns to and repeats step 412. If not received and the communication is terminated, the agent 184 proceeds to step 428 and terminates operation.

A number of variations and modifications of the invention can be used. It would be possible to provide for some features of the invention without providing others.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing a contact, comprising:
   (a) a telecommunication device initiating a live voice communication with a resource that is at least one of an Interactive Voice Response or IVR unit and a voice mail server in a contact center;
   (b) the telecommunication device receiving, as part of the communication, a first text message from the resource, the first text message corresponding to a first option of a menu structure in the resource;
   (c) the telecommunication device displaying the first text message on an associated character display;
   (d) the telecommunication device receiving, as part of the communication, a first audio message from the resource, the first audio message being a voiced version of the first text message; and
   (e) the telecommunication device audibly playing the first audio message, wherein the first text message is displayed and the first audio message played substantially simultaneously.

2. The method of claim 1, further comprising:
   (f) storing the displayed text in memory; and
   (g) scrolling through the displayed text at the request of a user of the telecommunication device.

3. The method of claim 1, wherein the servicing resource is the IVR unit and further comprising:
   (f) the telecommunication device receiving, as part of the communication a second text message from the IVR unit, the second text message corresponding to a second option in the menu structure, the first and second options being different and the first and second text messages being different;
   (g) the telecommunication device displaying the second text message on the associated character display;
   (h) the telecommunication device receiving, as part of the communication, a second audio message from the IVR unit, the second audio message being a voiced version of the second text message; and
   (i) the telecommunication device audibly playing the second audio message.

4. The method of claim 1, wherein the servicing resource is a voice mail server.

5. The method of claim 1, wherein the text message is transmitted to the telecommunication device out-of-band.

6. The method of claim 1, wherein the telecommunication device is circuit-switched.

7. The method of claim 1, wherein the text message is transmitted using at least one of the Teletypewriter protocol, DTMF signals, and the SMS protocol.

8. The method of claim 1, further comprising:
   (f) receiving a response from a user of the telecommunication device;
   (g) displaying the response on the character display;
   (h) storing the response in memory; and
   (i) scrolling through the displayed text at the request of the user of the telecommunication device.

9. The method of claim 8, further comprising:
   sending the response to the servicing resource only after a transmit request is received from the user.

10. The method of claim 8, further comprising:
    (j) at the command of the user, clearing the character display of currently displayed information before the displaying step.

11. The method of claim 8, further comprising:
    (j) inserting at least one marker character in the displayed response to separate the characters in the response from other displayed characters.

12. The method of claim 8, further comprising before the displaying step:
    sending the response to the servicing resource; and
    receiving, from the servicing resource, a second text message comprising the response.

13. A computer readable medium comprising executable instructions to perform the steps of claim 1.

14. A logic circuit operable to perform the steps of claim 1.

15. A telecommunication device, comprising:
    (a) an input operable to receive from an endpoint, as part of a live voice communication, a first text message and first audio message, the first audio message being a voiced version of the first text message, the first text message being a first option of a menu structure in the endpoint, the endpoint being at least one of an Interactive Voice Response or IVR unit and a voice mail server;
    (b) a character display;
    (c) at least one activator; and
    (d) a graphical display agent operable to substantially simultaneously (i) display the first text message on an associated character display and (ii) audibly play the first audio message.

16. The telecommunication device of claim 15, wherein the graphical display agent is further operable to (iii) store the displayed text in memory and (iv) scroll through the displayed text at the request of a user of the telecommunication device.

17. The telecommunication device of claim 15, wherein the endpoint is the Interactive Voice Response (IVR) unit.

18. The telecommunication device of claim 15, wherein the endpoint is the voice mail server.

19. The telecommunication device of claim 15, wherein the text message is transmitted to the telecommunication device out-of-band.

20. The telecommunication device of claim 15, wherein the telecommunication device is circuit-switched.

21. The telecommunication device of claim 15, wherein the input receives, as part of the communication a second text message from the IVR unit, the second text message corresponding to a second option in the menu structure, the first and second options being different and the first and second text messages being different and the graphical display agent being further operable to (iii) display the second text message on the associated character display and (iv) audibly play, as part of the communication, a second audio message from the IVR unit, the second audio message being a voiced version of the second text message.

22. The telecommunication device of claim 15, wherein the graphical display agent is further operable to (iii) receive a response from a user of the telecommunication device; (iv) display the response on the character display; (v) store the response in memory; and (vi) scroll through the displayed text at the request of the user of the telecommunication device.

23. The telecommunication device of claim 22, wherein the display agent is further operable to (vii) send the response to the servicing resource only after a transmit request is received from the user and wherein the text message is transmitted using at least one of the Teletypewriter protocol, DTMF signals, and the SMS protocol.

24. The telecommunication device of claim 22, wherein the display agent is further operable to (vii), at the command of the user, clear the character display of currently displayed information before the text in the text message is displayed.

25. The telecommunication device of claim 22, wherein the display device is further operable to (vii) insert at least one marker character in the displayed response to separate the characters in the response from other displayed characters.

26. The telecommunication device of claim 22, wherein the display agent is further operable to (vii) send the response to the endpoint and (viii) receive, from the endpoint, a second text message comprising the response.

27. A method for servicing a contact, comprising:
(a) a telecommunication device initiating a live voice communication with a resource in a contact center;
(b) the telecommunication device receiving, as part of the communication, a text message from the resource;
(c) the telecommunication device displaying the text message on an associated character display;
(d) the telecommunication device receiving, as part of the communication, an audio message from the resource, the audio message being a voiced version of the text message;
(e) the telecommunication device audibly playing the audio message;
(f) storing the displayed text in memory; and
(g) scrolling through the displayed text at the request of a user of the telecommunication device.

28. A method for servicing a contact, comprising:
(a) a telecommunication device initiating a live voice communication between a device user and a resource in a contact center, wherein the resource is one of an Interactive Voice Response (IVR) unit and a voice messaging system;
(b) the telecommunication device receiving, as part of the live voice communication, a text message from the resource;
(c) the telecommunication device displaying, during the live voice communication, the text message on an associated character display;
(d) the telecommunication device receiving, as part of the live voice communication, an audio message from the resource, the audio message being a voiced version of the text message; and
(e) the telecommunication device audibly playing, during the live voice communication, the audio message, wherein the text message is transmitted to the telecommunication device out-of-band.

29. A method for servicing a contact, comprising:
(a) a telecommunication device initiating a live voice communication with a resource in a contact center;
(b) the telecommunication device receiving, as part of the communication, a text message from the resource;
(c) the telecommunication device displaying the text message on an associated character display;
(d) the telecommunication device receiving, as part of the communication, an audio message from the resource, the audio message being a voiced version of the text message;
(e) the telecommunication device audibly playing the audio message;
(f) receiving a response from a user of the telecommunication device;
(g) displaying the response on the character display;
(h) storing the response in memory; and
(i) scrolling through the displayed text at the request of the user of the telecommunication device.

30. The method of claim 29, further comprising:
sending the response to the servicing resource only after a transmit request is received from the user.

31. The method of claim 29, further comprising:
(j) at the command of the user, clearing the character display of currently displayed information before the displaying step.

32. The method of claim 29, further comprising:
(j) inserting at least one marker character in the displayed response to separate the characters in the response from other displayed characters.

33. The method of claim 29, further comprising before the displaying step:
sending the response to the servicing resource; and
receiving, from the servicing resource, a second text message comprising the response.

34. A telecommunication device, comprising:
(a) an input operable to receive from an endpoint, as part of a live voice communication, a text message and an audio message, the audio message being a voiced version of the text message;
(b) a character display;
(c) at least one activator;
(d) a graphical display agent operable to (i) display the text message on an associated character display; (ii) audibly play the audio message; (iii) store the displayed text in memory; and (iv) scroll through the displayed text at the request of a user of the telecommunication device.

35. A telecommunication device, comprising:
(a) an input operable to receive from an endpoint, during a live voice communication between a user of the endpoint and one of an Interactive Voice Response (IVR) unit and a voice messaging system, a text message and an audio message, the audio message being a voiced version of the text message;
(b) a character display;
(c) at least one activator; and
(d) a graphical display agent operable to (i) display, during the live voice communication, the text message on an associated character display and (ii) audibly play, during the live voice communication, the audio message, wherein the text message is transmitted to the telecommunication device out-of-band.

36. A telecommunication device, comprising:
(a) an input operable to receive from an endpoint, as part of a live voice communication, a text message and an audio message, the audio message being a voiced version of the text message;
(b) a character display;
(c) at least one activator;
(d) a graphical display agent operable to (i) display the text message on an associated character display and (ii) audibly play the audio message, wherein the endpoint is a servicing resource of a contact center and wherein the graphical display agent is further operable to (iii) receive a response from a user of the telecommunication device; (iv) display the response on the character display; (v) store the response in memory; and (vi) scroll through the displayed text at the request of the user of the telecommunication device.

37. The telecommunication device of claim 36, wherein the display agent is further operable to (vii) send the response to the servicing resource only after a transmit request is received from the user.

38. The telecommunication device of claim 36, wherein the display agent is further operable to (vii), at the command of the user, clear the character display of currently displayed information before the text in the text message is displayed.

39. The telecommunication device of claim 36, wherein the display device is further operable to (vii) insert at least one marker character in the displayed response to separate the characters in the response from other displayed characters.

40. The telecommunication device of claim 36, wherein the display agent is further operable to (vii) send the response to the servicing resource and (viii) receive, from the servicing resource, a second text message comprising the response.

* * * * *